United States Patent [19]

Norris

[11] Patent Number: 5,447,601
[45] Date of Patent: Sep. 5, 1995

[54] METHOD OF MANUFACTURING A MOTION SENSOR

[75] Inventor: Timothy S. Norris, Saffron Walden, Great Britain

[73] Assignee: British Aerospace PLC, Farnborough, United Kingdom

[21] Appl. No.: 222,817

[22] Filed: Apr. 5, 1994

[30] Foreign Application Priority Data

Apr. 7, 1993 [GB] United Kingdom ............... 9307334

[51] Int. Cl.⁶ ........................................... H01L 21/302
[52] U.S. Cl. ........................................ 216/2; 437/974; 148/DIG. 135; 216/13; 216/47; 216/52; 216/75; 216/100
[58] Field of Search ................. 148/DIG. 9, DIG. 12, 148/135; 257/468, 419; 437/901, 974, 86; 156/643, 647, 657, 662; 73/505

[56] References Cited

U.S. PATENT DOCUMENTS

| | | | |
|---|---|---|---|
| 5,169,472 | 12/1992 | Goebel | 156/281 |
| 5,226,321 | 7/1993 | Varnham et al. | 73/505 |
| 5,310,450 | 5/1994 | Offenberg et al. | 156/662 |
| 5,320,705 | 6/1994 | Fujii et al. | 156/662 |

FOREIGN PATENT DOCUMENTS

| | | |
|---|---|---|
| 55-95373 | 7/1980 | Japan . |
| 62-221164 | 9/1987 | Japan . |
| 63-10575 | 1/1988 | Japan . |
| 2180691 | 4/1987 | United Kingdom . |
| 2194344 | 3/1988 | United Kingdom . |

OTHER PUBLICATIONS

J. Shajii et al., "A Microfabricated Floating-Element Shear Stress Sensor Using Water-Bonding Technology", Jour. of Microelectromechanical Systems, vol. 1, No. 2, Jun. 1992, pp. 89-94.

*Primary Examiner*—George Fourson
*Assistant Examiner*—Thomas G. Bilodeau
*Attorney, Agent, or Firm*—Cushman, Darby & Cushman

[57] ABSTRACT

The method comprises the steps of providing a substrate wafer (10); depositing a first layer of resist (12) upon the substrate wafer (10); removing selected areas of the first resist layer (12), thereby to provide first etch windows; forming first cavities (16) in the substrate wafer (10) by a first etching process through the first windows; bonding a relatively thick membrane wafer (24) to the substrate wafer (10), thereby covering the cavities (16); polishing the surface of the relatively thick membrane wafer (24) thereby to produce a relatively thin membrane (24a); depositing a second layer of resist (33) on the relatively thin membrane (24a); removing selected areas of the second deposited resist layer, thereby to provide second etch windows (40); etching away the relatively thin membrane (24a) in the region of the second etch windows (40) until the first cavities (16) are exposed, thereby to form in the relatively thin membrane (24a) a free standing resonator structure (18) suspended on a plurality of compliant beam mounts (38) extending from a fixed portion (50).

21 Claims, 6 Drawing Sheets

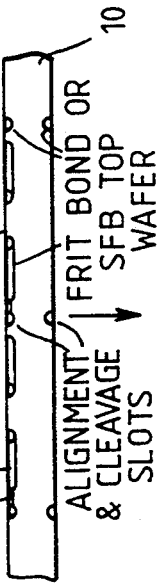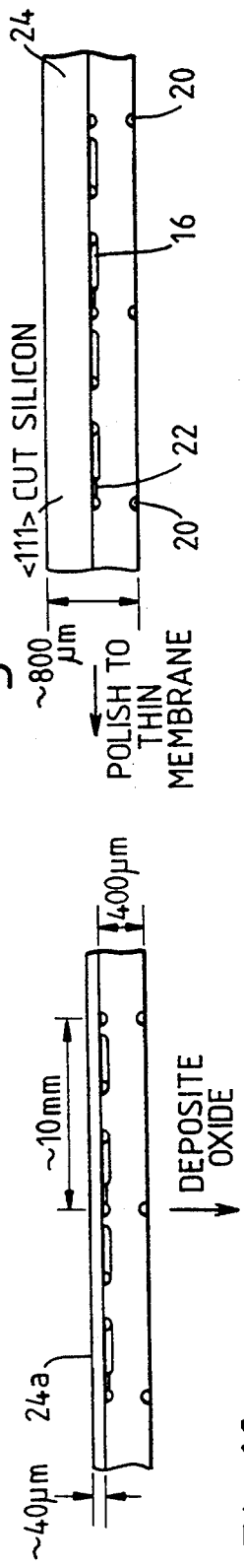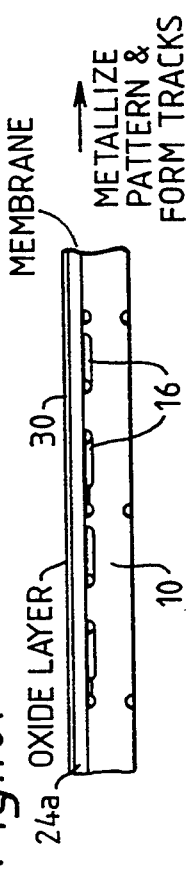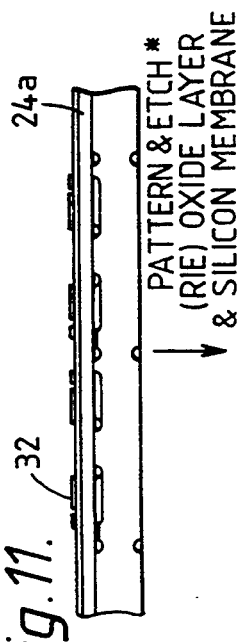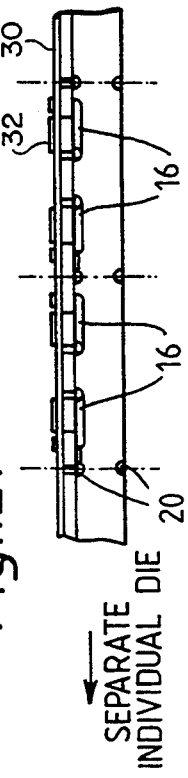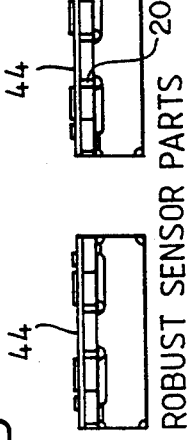

Fig. 14.
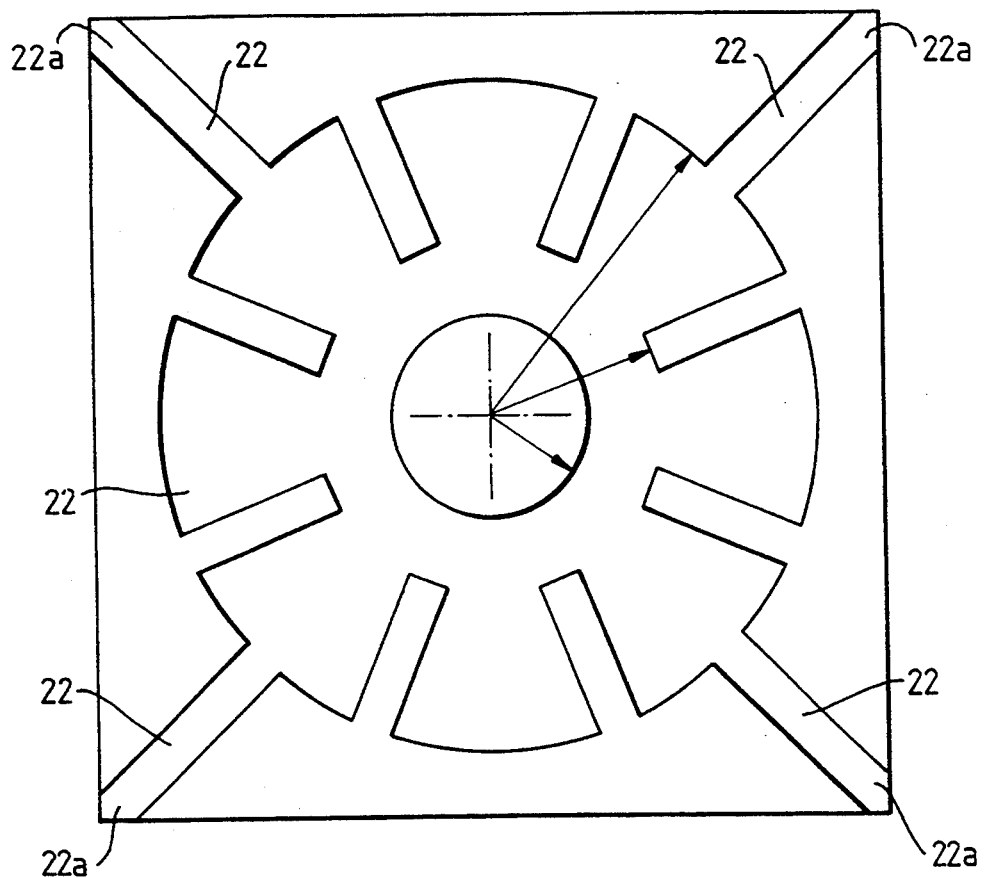
Fig. 21
VIBRATION FORM FOR
COS 2θ MODE & DEFINITION
OF AXES
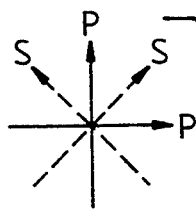
(PLAN VIEW)
PRIMARY (P)   SECONDARY (S)
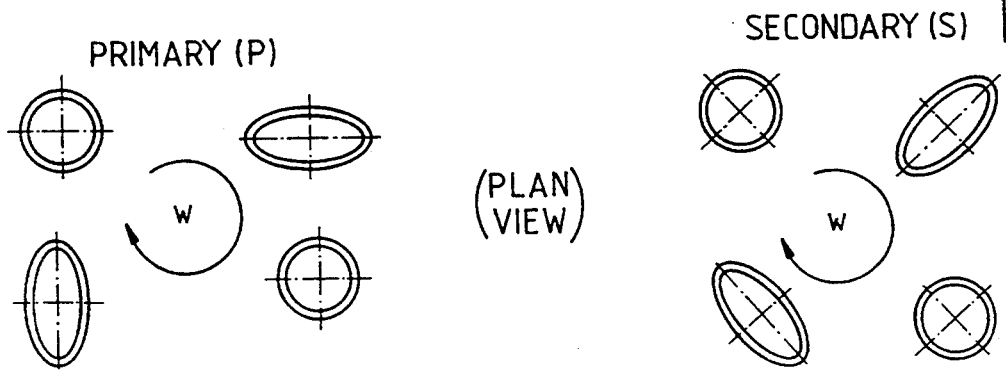

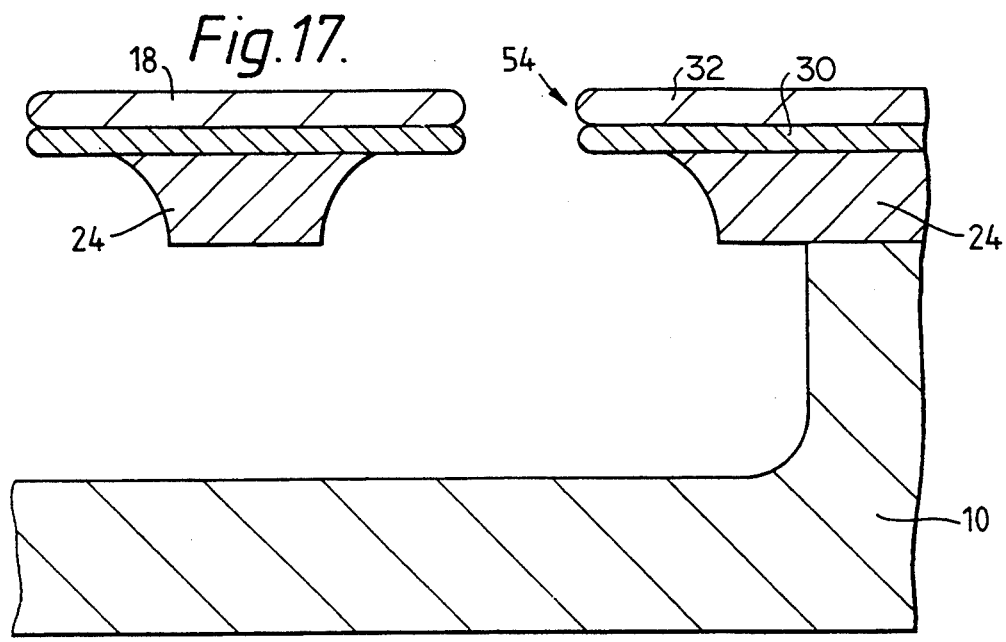
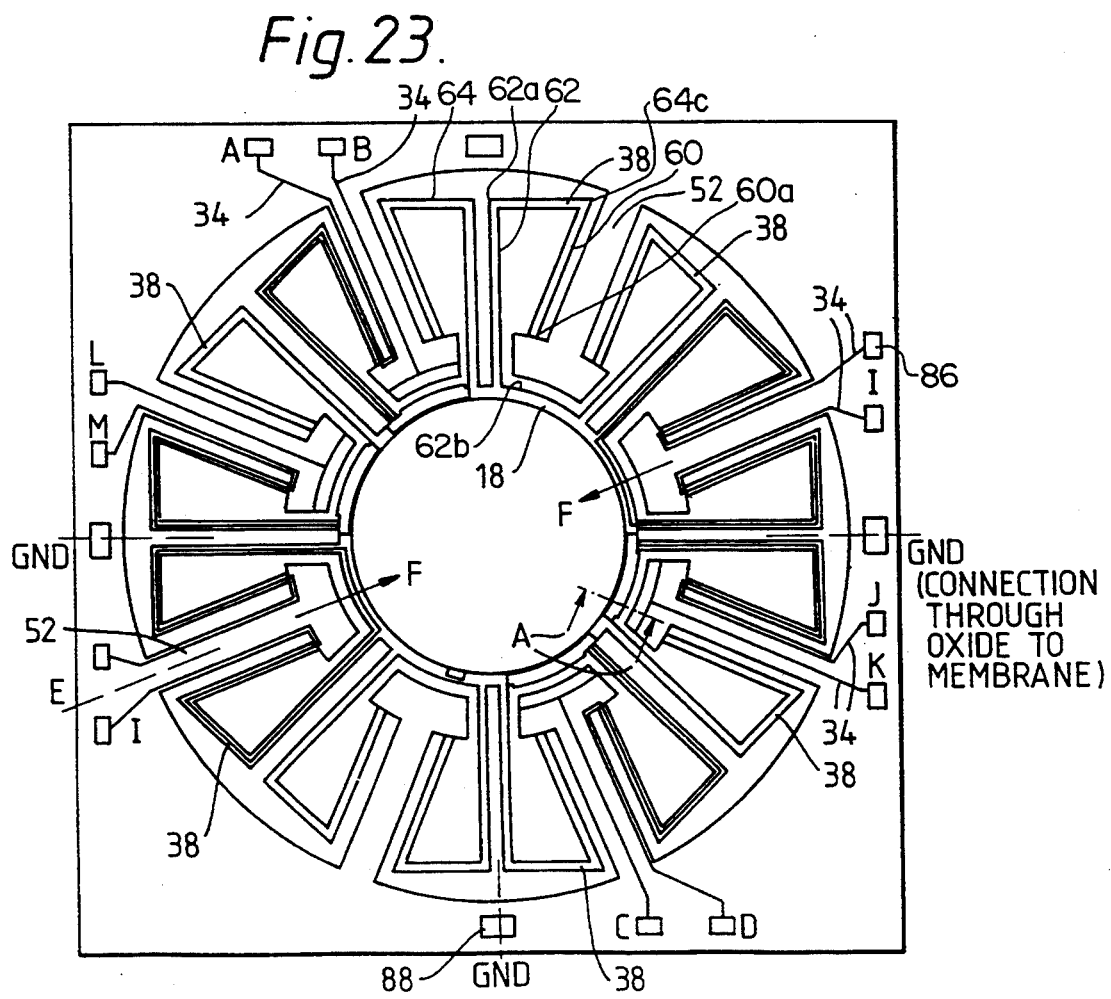

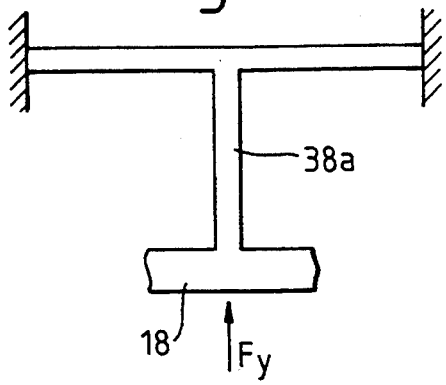
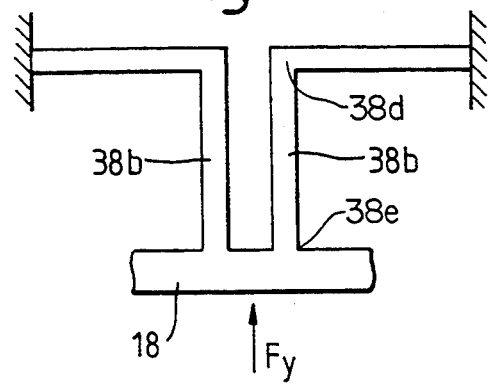
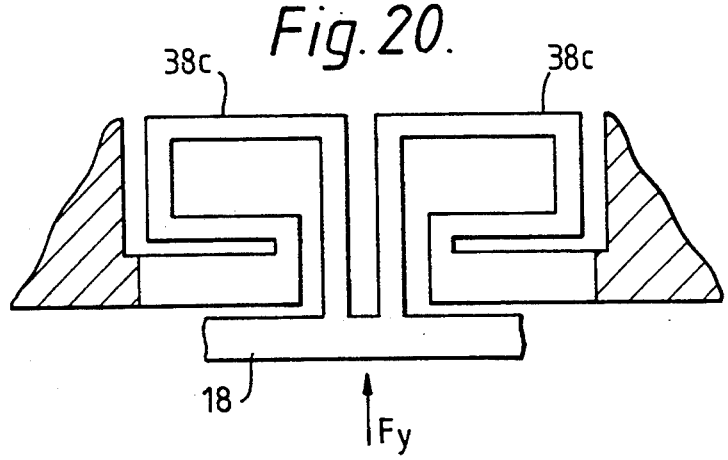
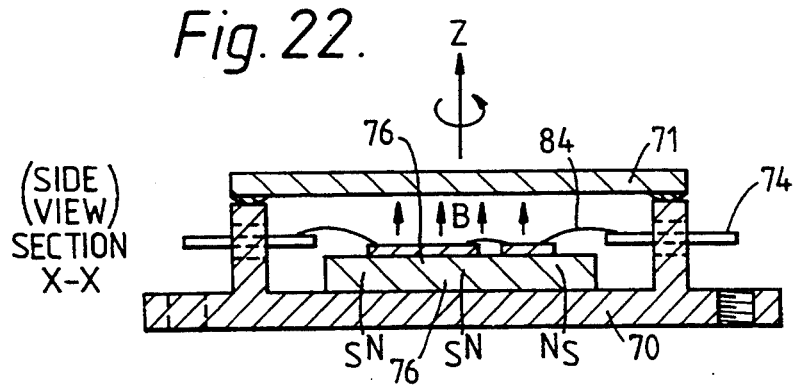

METHOD OF MANUFACTURING A MOTION SENSOR

FIELD OF THE INVENTION

The present invention relates to a method of manufacturing a motion sensor and relates particularly but not exclusively to the manufacture of 8 motion sensor of the type used to detect rotation about a central axis.

BACKGROUND OF THE RELATED ART

U.S. Pat. No. 5,226,321, discloses an example of a vibrating rate sensor which employs a bonded stack of three plates with excitation and pickoff transducing achieved by electrostatic techniques. Unfortunately, the form of construction used in this arrangement results in a relatively bulky sensor which is expensive to make. Microfabricated silicon sensors are finding application in a variety of applications; these commercially available sensors employ thin membranes (e.g. pressure sensors), and occasionally have resonators of free-standing cantilever or beam form [Greenwood et al.]. These membranes are typically restricted to only 15 um thickness or less on account of technical problems of film stresses when depositing layers in a CVD furnace (chemical vapour deposition) or diffusing sufficient boron into the silicon water surface to form an effective etch-stop to anisotropic etches. Moreover, recent research [1] has shown that the heavy boron doping ($>1$ atom of boron to 1000 atoms of silicon) causes instabilities, manifested as ageing effects, in the elasticity of the silicon membranes produced by subsequent anisotropic etching; although compensation can be applied to stabilize elasticity by applying simultaneous germanium diffusion with the boron, but this does not avoid additional further microcracking problems in the membrane.

OBJECTS OF THE INVENTION

It is an object of the present invention to provide a method of manufacturing a motion sensor of very compact construction, which avoids the problem of having to align substrates accurately with another during assembly, and which attempts to retain the near perfect mechanical qualities of the single crystal silicon wafer used to form the resonator or vibrating portion of the sensor. In addition to this, the proposed method does not compromise the ability of a resonator, of hoop-like or ring form suspended on a compliant mount, from permitting multi-axial inertial sensing to be achieved.

SUMMARY OF THE INVENTION

Accordingly, the present invention provides a method of manufacturing a motion sensor, including the steps of providing a substrate wafer; depositing a first layer of resist upon the substrate wafer, removing selected areas of the first resist layer, thereby to provide first etch windows; forming first cavities in the substrate wafer by a first etching process through the first windows; bonding a relatively thick membrane wafer to the substrate wafer, thereby covering the cavities, polishing the surface of the relatively thick membrane wafer thereby to produce a relatively thin membrane; depositing a second layer of resist on the relatively thin membrane; removing selected areas of the second deposited resist layer, thereby to provide second etch windows; etching away the relatively thin membrane in the region of the second etch windows until the first cavities are exposed, thereby to form in the relatively thin membrane a free standing resonator structure suspended on a plurality of compliant beam mounts extending from a fixed portion.

It will be appreciated that the above mentioned method enables a sensor of very compact construction to be made and avoids the problem of aligning substrates accurately with one another during assembly. The step of polishing the surface of the relatively thick membrane wafer to produce a relatively thin membrane and then subsequently etching the membrane to produce a free standing resonator structure suspended on a plurality of compliant mounts enables the near perfect mechanical properties of the wafer to be maintained.

Advantageously, the relatively thick membrane wafer is bonded to the substrate wafer by employing a glass frit film applied to a surface of one or other of the wafers and in which heat and/or pressure are applied to the frit during bonding.

Conveniently, the frit layer is spun or silk screen printed onto the substrate wafer.

In order to produce a good bond between the relatively thick membrane wafer and the substrate wafer a silicon fusion bonding technique may be used.

Alternatively, the relatively thick membrane wafer may be bonded to the substrate wafer by means of an eutectic or polymer adhesive bond.

The resist layers may be deposited as a spun layer, thereby providing an even and suitably thin coating.

For best results, the etch process preferably comprises an isotropic or dry gas etching process.

Vent channels may be etched in the substrate layer in order to avoid the possibility of air bubbles being trapped between the substrate layer and the membrane wafer.

A number of sensors may be made on the same substrate layer and may be separated from each other by breaking along etched cleavage channels provided in the substrate layer.

Electrode tracks may be provided by:

(a) depositing a dielectric layer on the polished surface of the membrane wafer; and (b) depositing a plurality of electrode tracks on the dielectric layer and wire bonding pads near the periphery of the membrane wafer.

Conveniently, the electrode tracks and/or wire bonding pads are deposited by coating the dielectric with a metal and then removing unwanted metal by a gaseous or aqueous etching process.

For best results, a support member is provided below at least part of the relatively thick membrane wafer thereby to support the membrane during polishing.

For a particularly flexible arrangement, the compliant beam mounts may be formed in the form of a T-shaped bar, two ends of which are secured to the substrate wafer and one end being linked to the suspended resonator structure.

Alternatively, the compliant beam mounts may be formed in the form of a double L shaped bar, one of each bar being secured to the substrate wafer and the other end being linked to said suspended resonator structure.

For maximum flexibility the compliant beam mounts are formed in a substantially triangular form having first and second substantially radially extending portions and a linking portion extending therebetween, the first radially extending portion being secured at a first end to the substrate wafer and at a second end to a first end of the linking portion which is connected at a second end to a first end of the second radially extending portion which in turn is connected at an otherwise free end to the suspended resonator structure.

The free standing resonator structure may be formed radially inwardly of the compliant beam mounts, or alternatively, if a particularly compact arrangement is required, the free standing resonator structure may be formed radially outwardly of the compliant beam mounts.

For convenience, a plurality of motion sensors may be made on the same substrate wafer and divided from each other by parting alone cleavage channels.

The method may comprise the additional step of forming a plurality of electrostatic pick-offs by etching away substrate wafer material at desired pick-off positions so as to undercut the relatively thin membrane at the position to thereby create projecting pick-off members on adjoining parts of the resonator structure and the fixed portion.

In a particularly compact arrangement, the method may include the further step of forming radially extending piers on the fixed portion to which the compliant beams are anchored.

Also claimed in the present application is a motion sensor when made in accordance with the above method.

DESCRIPTION OF THE DRAWINGS

The present invention will now be more particularly described by way of example only with reference to the following drawings in which:

FIGS. 1 to 13 illustrate various manufacturing steps in the production of a rate sensor according to the present invention, FIG. 14 illustrates an arrangement of cavities used to avoid bonding problems;

FIG. 17 is a cross sectional view in the direction of arrows A—A in FIG. 23 and illustrates the pick-off arrangement;

FIGS. 18 to 20 illustrate various shapes of mounting beam.

FIG. 21 illustrates the mode of vibration of the sensor illustrated in the above mentioned drawings, FIG. 22 shows the sensor when incorporated in a casing.

FIG. 23 shows the principal transducing features.

DESCRIPTION OF EMBODIMENTS OF THE INVENTION

Figure 2:
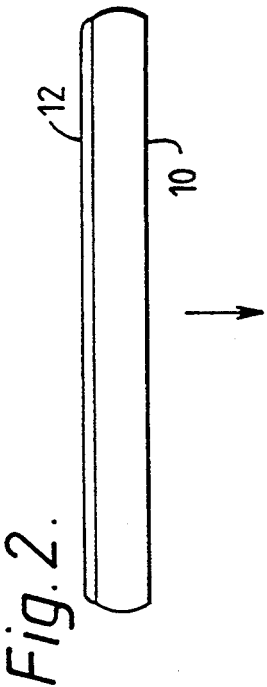
Figure 3:
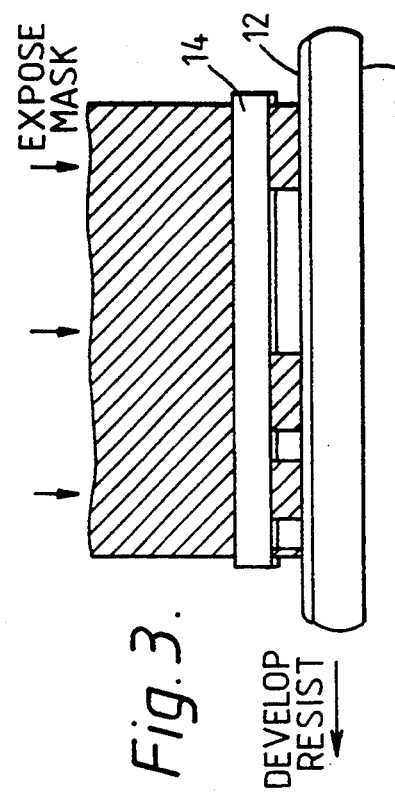
Figure 6:
Figure 1:
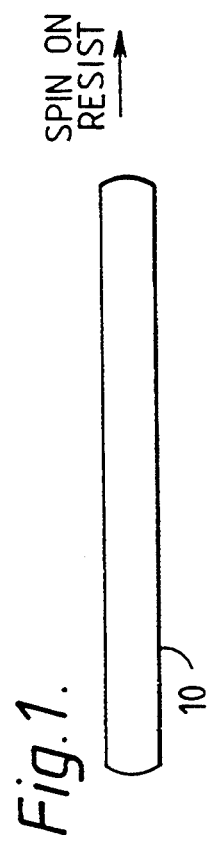
Figure 4:
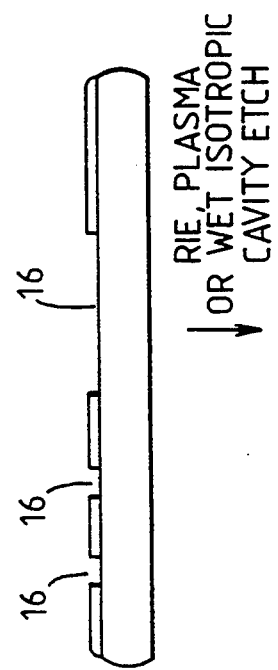
Figure 5:

With reference to FIGS. 1 to 13, the initial wafer 10, hereby referred to as the "substrate wafer" is spun with organic resist 12 which is subsequently patterned using an exposure mask 14 to provide etch windows; cavities 16 are then formed into the substrate wafer by etching through the windows into the lower substrate using either isotropic or dry gas (RIE or plasma) processes. These cavities can either be for where free standing structures such as the resonator 18 or associated beam suspension are to be produced, cleavage channels 20 for later parting the wafer into separate die, or for venting channels 22 discussed in detail later. The substrate 10 is preferably silicon although glasses with thermal coefficients of expansion matched to that of silicon could also be employed. Venting channels 22 best seen in FIG. 14 may be fabricated as extended cavities so that no isolated cavities are formed when the second wafer 24 herewith referred to as the "membrane wafer", is bonded to the substrate wafer 10. Bonding of the membrane wafer 24 to the substrate wafer 10 (FIG. 7) can be achieved preferably by silicon fusion bonding, or glass frit film bonding by heating the pair of wafers to high temperature (e.g. 900 degrees Centigrade) and applying moderate pressure to make the frit 26 flow; the venting channels 22 avoid pressure differentials occurring during this high-temperature process. The frit bonding process has the advantages of being relatively insensitive to dust contamination on the wafer surfaces to be bonded in comparison to the SFB process which demands general contact between the two wafer surfaces at the atomic level in order to provide acceptable yields. The frit layer 26 is preferably spun or silk-screen printed onto the substrate wafer 10 because the frit layer has imperfect elastic properties which could degrade the characteristics of the membrane wafer 24, i.e. the fret film 26 should only be present at the intended contact regions where cavities do not occur. Alternatively, an eutectic bond or polymer-adhesive bond could be considered to join the two wafers but would give inferior results in comparison to the frit bonding or silicon fusion bonding (SFB) methods.

In the invention described above, the membrane wafer 10 can be lightly-doped silicon which does not suffer the instabilities and ageing characteristics exhibited by highly boron-doped silicon membranes which are highly stressed. As shown after the bonding process in FIG. 8, the membrane wafer 24 is then subsequently polished (FIG. 9) to a thin membrane 24a of typically 50 um thickness using a rotary lapping/polishing tool and diamond paste; alternatively, chemical polishing of the membrane using a suitable chemical agent could be employed although the substrate wafer 10 and the peripheral exits 22a from the venting channels 22 would have to be protected from the chemical polishing agent; a membrane of 50 um thickness would be difficult to produce by alternative methods such as boron doping or CVD.

The polished surface of the membrane wafer 22a can then have a silicon dioxide or silicon nitride dielectric layer 30 of approximately 1 um thickness applied, preferably by a low-temperature CVD process, and then coated in metal 32 (eg aluminium) by vacuum thermal evaporation or sputtering processes after which the metal may be subsequently patterned, either using a gaseous RIE etch or am aqueous etch, to provide electrode tracking 34 and wire bonding pads 36 near the periphery of each die on the wafer (FIG. 11).

In order to form the freely-vibrating ring resonator 18 suspended on compliant-beam mount 38 the thinned membrane 24a is then spun with resist 33 which is patterned using a mask to provide etch windows 40. The thinned membrane is then subsequently plasma or RIE etched through the resist etch windows 40 until the cavities 16 beneath are reached. At this stage, the wafer pair can be parted along the cleavage channels 20 to provide individual sensors 44. Cleaving the wafer pair along preformed channels is preferable to scribing or sawing the wafer because these operations produce considerable debris which would occlude the cavities.

Figure 15:
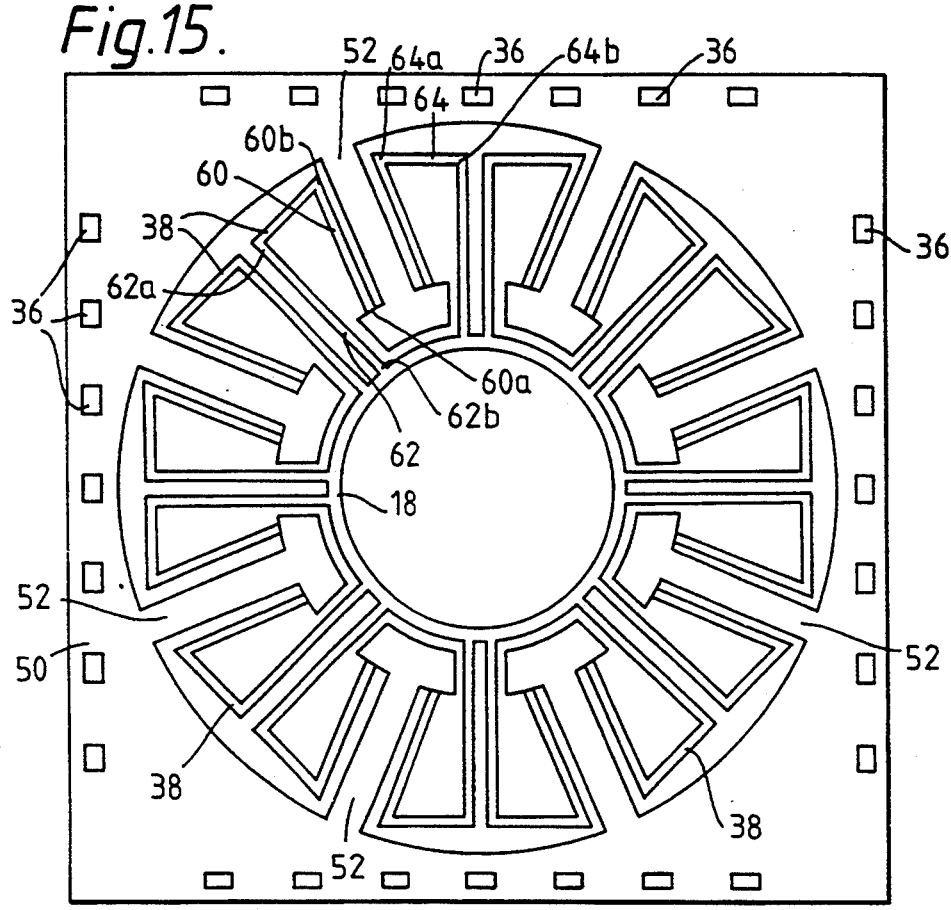
FIGS. 15 and 16 illustrate edge mounted and center mounted sensor arrangements.
Figure 16:
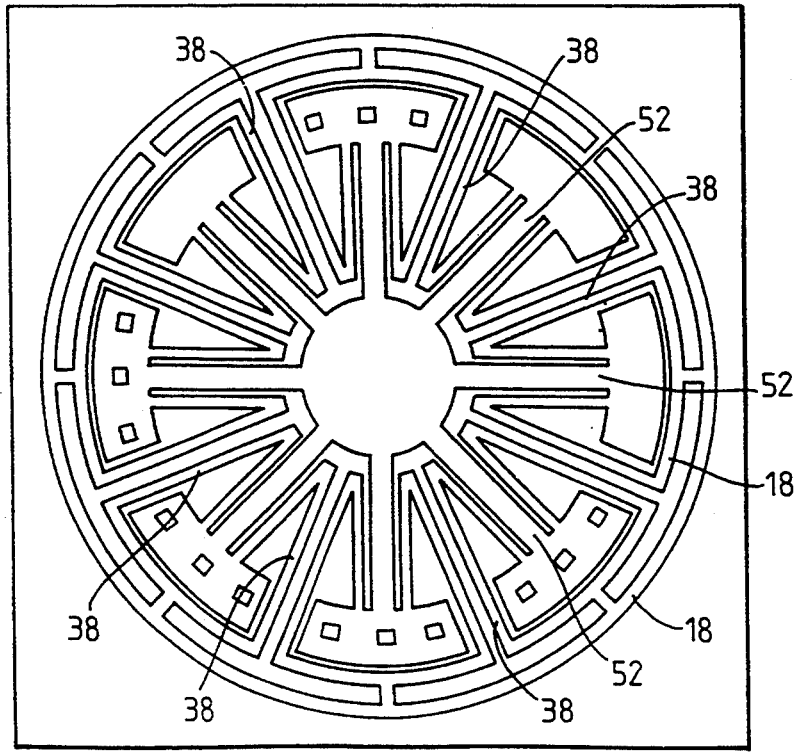

FIG. 15 shows a plan view example of the resonator structure in edge-supported configuration. A corresponding inside-supported configuration as shown in FIG. 16 is possible and provides a more compact device and better isolation of die mounting stresses; however, connection of bonding wires 34 is more difficult in the inside-supported configuration because the bond wires must be straggled above and across the resonator. In order to provide en isotropic elasticity in the plane of the sensor, the <111> silicon crystal plane must be exposed at the membrane surface (i.e. the membrane wafer must be of <111> cut); other selected crystal planes can be employed but would require the resonator dimensions to be appropriately modified in order to achieve matching of the Eigenmodes.

The basic form of the sensor comprises the resonator 18, compliant supports 38 and mounting region 50 which can have extended piers 52 for forming electrostatic pick-offs 54 for example. Alternative vibration transducing methods such as piezoresistive strain gauges along the beams or optical reflection could be employed for this application although electrostatic pick-off is straightforward to implement and does not give any associated power dissipation at the sensor which could give rise to temperature gradients that could result in undesirable sensor warm-up characteristics. An example of overhang pick-off electrodes 54 is shown in FIG. 17; this type of electrode structure is produced by the undercutting characteristic of the etch used to form the resonator and provides acceptable transducing sensitivity. FIG. 14 shows the corresponding cavity layout needed to compliment the membrane structure shown in FIG. 15.

The compliant support beams 38 can be of "T"-bar, "L"-bar or folded form as shown in FIGS. 18 to 20. Preferably, there should be eight (or multiple thereof) suspension beams present in order to ensure Eigenmode matching in the case of the cos $2\theta$ mode. The folded form or open loop suspension beam 38 is particularly efficient at providing a compliant mount whilst demanding relative coarse geometries and requiring a practical proportion of die area.

It will be seen from FIGS. 18 to 20 that one end (or pair of ends) 38d of each beam is secured to the substrate wafer 10 whilst the otherwise free end (or ends) 38e is linked to the suspended resonator structure 18 for movement therewith. A substantially triangular form of beam is illustrated in a number of the drawings. This particularly flexible arrangement comprises first and second generally radially extending portions 60, 62 (FIG. 15) and a linking portion 64 extending therebetween, the first radially extending portion being secured at a first end 60a to the substrate wafer 10 and at a second end to a first end 64c of the linking portion which is, in turn, connected at a second end to a first end 62a of the second radially extending portion which, in turn, is connected at an otherwise free end 62b to the suspended resonator structure 18.

In its compliant support, the ring or hoop-like resonator 18 can be excited into a vibration pattern as shown schematically in FIG. 21. If movement is excited along the primary axes (denoted by P in FIG. 21), rotation of the resonator about its Z-axis (perpendicular to the plane of the membrane) results in Coriolis forces coupling vibrations from the primary axes to the secondary axes; detection of vibrations occurring along the secondary axes permits the applied turning rate to be sensed.

When subjected to linear acceleration, the ring or hoop-like resonator behaves as a seismic mass end moves within its compliant support relative to the substrate region in which the cavities are formed. By detecting the relative movement of the resonator 18, linear acceleration applied to the entire structure can be sensed by appropriate pickoff transducers.

The invention offers, in compact form, the feature of sensing linear acceleration and applied turning rate simultaneously; the various motion inputs applied to the sensor can be distinguished in the electronic signal processing circuits associated forming part of the complete sensor.

(U.S. Pat. No. 5,226,321) describes a number of methods for exciting movement in the resonator and detecting resonator motion. The preferred method in this invention for forcing the resonator to vibrate is electromagnetic whereas electrostatic (capacitive) pickoff is chosen for vibration sensing (pickoff). Selecting different techniques for excitation and pickoff ensure that there is negligible transmission of excitation signal directly to the pickoff (i.e. "parasitic feedthrough") which would tend to mask the desired signal which is related to vibration and seismic motion of the resonator. FIG. 22 shows the general form of a practical implementation of the invention; the design permits miniaturization where the resonator die could be as small as 5 mm×5 mm, since the available signal-to-noise ratio degrades rapidly, for the preferred excitation and pickoff methods, as the resonator diameter is reduced below 3 mm.

In the general schematic layout of FIG. 22, the sensor has a general casing 70, 71 consisting of a strongly paramagnetic material (e.g. nickel-iron alloy, plated steel or en alloy of rare-earth elements) which provides a low-reluctance magnetic inference. The casing has connection pins 74 to permit connection to remote devices. Moreover, the sensor can be mounted by means of its casing (70, 71). Contained within the sensor casing 70, 71 is a permanent magnet 76 which is polarized so that the upper and lower faces have opposite magnetic polarity; the magnet is ideally of sintered rare-earth elements (e.g. samarium-cobalt) because this type of permanent magnet offers very high field densities, high remnance and low temperature coefficient of magnetomotive force. In the sensor casing, the magnetic field is arranged to be perpendicular to the plane of the resonator membrane.

Mounted onto the magnet is the planar sensor 80 in close proximity to the signal processing circuits; the processing circuit in FIG. 22 is assumed to be a custom integrated circuit, although the avoidance of the need for a highly boron-doped etch stop in the invention provides membrane silicon of adequately moderate doping to allow the signal processing to be fully integrated into the membrane itself if necessary. Bond wires 84 link the resonator and associated circuits to the casing pins 74. For high performance applications, the sensor case may be evacuated to increase the Q-factor of the resonator; however, the use of thick 50 um membranes means that air damping effects are manageable at atmospheric pressure permitting device operation without the complexity of providing a vacuum. Air damping effects are known from reports in the literature to be significant for small resonators of 15 um thickness, and to be produced in silicon nitride deposited films or anisotropically-etch of surface-boron-doped silicon wafers.

In order to achieve the electromagnetic excitation and electrostatic pickoff, certain transducer features ere required on the membrane structures. FIG. 23 shows the principal transducing features. The membrane is coated in a layer of insulating dielectric of silicon nitride or silicon oxide, as described previously, in order to prevent the conductor tracks unintentionally from shorting to the membrane. High conductivity tracks 34 are deposited onto the insulating dielectric. Connection windows are present in the dielectric at specific positions to allow electrical connection to the bulk of the membrane material, e.g. in the vicinity of the end bonding pads 86 and to the resonator itself 18; this guarantees the resonator potential in order to avoid any parasitic feedthrough from the excitation tracks to the pickoffs and also from bond pad to bond pad. The resistance of the driver conductor 34 is made low (a few ohms) so that current flow, resulting in a radial force F, is not associated with any change in potential in the vicinity of the resonator; this avoids stray electrostatic coupling of the excitation to the capacitive pick-off. The membrane bulk material, including the resonator and support beams, may be maintained at an elevated potential whereas the drive and tracking and pickoff electrodes may be operated at nearly system ground potential in a practical implementation.

Various modifications end alterations may be made to the embodiments of the present invention described and illustrated, within the scope of the present invention as defined in the following claims.

APPENDIX

[1] Aging phenomena in heavily doped (p') micromachined silicon cantilever beams M. Tabib—Azar, K. Wong and Wen Ko., Sensors and Actuators A, 33(1992) pp. 199–206.

What is claimed is:

1. A method of manufacturing a motion sensor, including the steps of:
   (a) providing a substrate wafer;
   (b) depositing a first layer of resist upon said substrate wafer;
   (c) removing selected areas of said first resist layer, thereby to provide first etch windows;
   (d) forming first cavities in said substrate wafer by a first etching process through said first windows;
   (e) bonding a membrane wafer sufficiently thick to cover said first cavities, to said substrate wafer;
   (f) polishing a surface of said membrane wafer to thereby thin said membrane wafer;
   (g) depositing a second layer of resist on said membrane wafer;
   (h) removing selected areas of said second deposited resist layer, thereby to provide second etch windows;
   (i) etching away said membrane wafer in a region of said second etch windows by a second etching process until said first cavities are exposed, thereby to form in said membrane wafer a free standing resonator structure suspended on a plurality of compliant beam mounts extending from a fixed portion.

2. A method as claimed in claim 1, wherein said step of bonding said membrane wafer to said substrate wafer is performed by applying a glass frit film to a surface of one of said membrane wafer and said substrate wafer and applying at least one of heat and pressure to said frit during said step of bonding.

3. A method as claimed in claim 2, wherein said glass frit film is applied by at least one of spinning and silk screen printing.

4. A method as claimed in claim 1, wherein said step of bonding said membrane wafer to said substrate wafer is performed by a silicon fusion bonding technique.

5. A method as claimed in claim 1, wherein said step of bonding said membrane wafer to said substrate wafer is performed by means of at least one of an eutectic bond and polymer adhesive bond.

6. A method as claimed in claim 1, wherein at least one of said first layer of resist and said second layer of resist is deposited as a spun layer.

7. A method as claimed in claim 1, wherein said first etching process comprises at least one of an isotropic and dry gas etching process.

8. A method as claimed in claim 1, further including a step of etching venting channels in said substrate wafer.

9. A method as claimed in claim 1, further including a step of etching cleavage channels in said substrate wafer.

10. A method as claimed in claim 1, further including steps of:
    depositing a dielectric layer on said polished surface of said membrane wafer;
    depositing a plurality of electrode tracks on said dielectric layer and wire bonding pads near a periphery of said membrane wafer.

11. A method as claimed in claim 1, wherein said step of depositing said plurality of electrode tracks and wire bonding pads is performed by coating said dielectric layer with a metal and then removing unwanted metal by at least one of a gaseous and aqueous etching process.

12. A method as claimed in claim 1, further including a step of providing a support member beneath at least a portion of said membrane wafer to thereby support said portion of said membrane wafer during said step of polishing.

13. A method as claimed in claim 1, further including a step of forming said compliant beam mounts in a form of a "T" shaped bar, two ends of said compliant beam mounts being secured to said substrate wafer and one end of said compliant beam mounts being linked to said suspended resonator structure.

14. A method as claimed in claim 1, further including a step of forming said compliant beam mounts in a form of a double "L" shaped bar, one end of each of said double "L" shaped bar being secured to said substrate wafer and a second end being linked to said suspended resonator structure.

15. A method as claimed in claim 1, further including a step of forming said compliant beam mounts in a form of an open-ended loop having a first end secured to said substrate wafer and a second end being linked to said suspended resonator structure.

16. A method as claimed in claim 1, further including a step of forming said compliant beam mounts in a substantially triangular form having first and second substantially radially extending portions and a linking portion extending therebetween, said first radially extending portion being secured at a first end to said substrate wafer and at a second end to a first end of said linking portion which is connected at a second end to a first end of said second substantially radially extending portion which in turn is connected at a second end to said suspended resonator structure.

17. A method as claimed in claim 1, further including a step of forming said free standing resonator structure radially inwardly of said compliant beam mounts.

18. A method as claimed in claim 1, further including a step of forming said free standing resonator structure radially outwardly of said compliant beam mounts.

19. A method as claimed in claim 18, further including steps of:
- etching cleavage channels in said substrate wafer;
- making a plurality of motion sensors on said substrate wafer; and
- dividing said plurality of motion sensors from each other by parting along said cleavage channels.

20. A method as claimed in claim 1, further including a step of forming a plurality of electrostatic pick-offs by etching away material from said substrate wafer at a desired pick-off position so as to undercut said membrane wafer at said desired pick-off position, thereby creating projecting pick-off members on adjacent parts of said resonator structure and said fixed portion.

21. A method as claimed in claim 1, further including a step of forming radially extending piers on said fixed portion to which said compliant beams are anchored.

* * * * *